US011784958B2

(12) United States Patent
Gosalia (10) Patent No.: US 11,784,958 B2
(45) Date of Patent: Oct. 10, 2023

(54) VEHICLE IDENTIFICATION AND DEVICE COMMUNICATION THROUGH DIRECTIONAL WIRELESS SIGNALING

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 81 days.

(21) Appl. No.: 17/323,712

(22) Filed: May 18, 2021

(65) Prior Publication Data

US 2021/0281532 A1  Sep. 9, 2021

Related U.S. Application Data

(63) Continuation of application No. 16/019,188, filed on Jun. 26, 2018, now Pat. No. 11,012,401.

(51) Int. Cl.
*H04L 51/48* (2022.01)
*H04W 76/14* (2018.01)
*H04W 8/20* (2009.01)
*H04W 4/021* (2018.01)
*H04W 4/02* (2018.01)
*H04W 4/40* (2018.01)
*H04L 51/212* (2022.01)

(52) U.S. Cl.
CPC ............ *H04L 51/48* (2022.05); *H04L 51/212* (2022.05); *H04W 4/021* (2013.01); *H04W 4/026* (2013.01); *H04W 4/40* (2018.02); *H04W 8/205* (2013.01); *H04W 76/14* (2018.02)

(58) Field of Classification Search
None
See application file for complete search history.

(56) References Cited

U.S. PATENT DOCUMENTS

| 10,051,072 B2* | 8/2018 | Bunner | H04L 67/54 |
| 2005/0222752 A1* | 10/2005 | Sokola | H04W 4/48 701/532 |
| 2011/0208417 A1* | 8/2011 | Fink | G08G 1/096827 701/532 |
| 2013/0247151 A1* | 9/2013 | Barrett-Bowen | G06F 21/6245 726/4 |

(Continued)

*Primary Examiner* — Yaotang Wang
(74) *Attorney, Agent, or Firm* — Haynes and Boone, LLP (57) ABSTRACT

There are provided systems and methods for vehicle identification and device communication through directional wireless signaling. A user's device may include a directional wireless transceiver that may be used to provide wireless signaling in a specific target direction. The user may direct the device at a particular vehicle, where the vehicle may has a transceiver located within or attached to the vehicle that responds to the particular wireless signaling. The vehicle's transceiver may respond to the device of the user with a unique identifier that allows for communication with the vehicle's operator. The unique identifier may therefore allow for message content to be sent directly to a device for the vehicle's operator, or may allow for a service provider to process the message. Additionally, the vehicle's operator may establish privacy settings for communications, which may be utilized to determine whether the message content will be provided to the device.

20 Claims, 6 Drawing Sheets

(56) References Cited

U.S. PATENT DOCUMENTS

| | | | |
|---|---|---|---|
| 2014/0122114 A1* | 5/2014 | Wesley | G06Q 20/327 |
| | | | 705/2 |
| 2015/0310739 A1* | 10/2015 | Beaurepaire | G08G 1/096716 |
| | | | 701/117 |
| 2015/0373502 A1* | 12/2015 | Wormald | H04L 67/52 |
| | | | 455/456.3 |
| 2015/0382133 A1* | 12/2015 | Vandeweerd | H04M 1/72412 |
| | | | 455/41.2 |
| 2016/0065541 A1 | 3/2016 | Winner et al. | |
| 2016/0071082 A1 | 3/2016 | Driscoll et al. | |
| 2016/0173568 A1 | 6/2016 | Penilla et al. | |
| 2016/0189116 A1* | 6/2016 | Cattone | G06Q 10/20 |
| | | | 705/27.2 |
| 2017/0084174 A1 | 3/2017 | Suzuki | |
| 2017/0270490 A1* | 9/2017 | Penilla | G07C 5/006 |
| 2019/0205854 A1* | 7/2019 | Baren | G07F 9/002 |

\* cited by examiner

VEHICLE IDENTIFICATION AND DEVICE COMMUNICATION THROUGH DIRECTIONAL WIRELESS SIGNALING

CROSS REFERENCE TO RELATED APPLICATIONS

This application is a continuation of U.S. patent application Ser. No. 16/019,188, filed on Jun. 26, 2018, issued as U.S. Pat. No. 11,012,401, which is incorporated by reference in its entirety.

TECHNICAL FIELD

The present application generally relates to directional wireless signaling and vehicle identification and more specifically to providing identification of a vehicle and a device associated with the vehicle for direct communication using a wireless communication component that provides directional signaling.

BACKGROUND

When utilizing vehicles, operators may be unaware of particular vehicle conditions that introduce safety hazards or financial consequences. For example, a driver of a car may be unaware that their gas tank is open or that a panel is loose, which may harm the vehicle and/or other cars operating near the vehicle. At other times, a car may be parked but the parking spot may be in an unauthorized area or where a parking meter has expired. Other vehicle operators may see the hazard, but may be unable to directly communicate with the driver of the vehicle. The other operators may attempt to get the attention of the driver by honking a horn or flashing lights at the vehicle, but this may introduce additional hazards and divert the attention of the driver and other drivers. At other times, the vehicle may be unattended and the vehicle's owner may not be in close enough proximity to resolve the issue. Alerting a police service or other authority may allow for tracking of the vehicle, but may not immediate assist the driver. Thus, the potential issue may be unresolved and cause harm.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for vehicle identification and device communication through directional wireless signaling. Systems suitable for practicing methods of the present disclosure are also provided.

An observer of a vehicle may notice an issue with the vehicle and may wish to report the issue to the operator of the vehicle or other authority. The observer may utilize a first communication device, such as a mobile smart phone, to determine an identifier for the vehicle, for example, by using directional wireless communications targeting the vehicle and capturing additional data for the vehicle if necessary. The directional wireless communications may allow the first device to retrieve an identifier for the vehicle from a communication component associated with the vehicle, such as a vehicle's on-board computing device, a wireless transceiver beacon attached to or included with the vehicle, and/or another communication device within the vehicle (e.g., a mobile smart phone of a driver or passenger in the vehicle). The additional data received by a directional transceiver of the first device may be utilized to uniquely identify the particular vehicle through data analysis by the first device and/or a service provider. After retrieving the unique identifier for the vehicle, the observer's first device may be used to determine an identifier of a person or entity associated with the vehicle and generate a communication to a second device associated with the person or entity (generally referred to herein as an operator) of the vehicle. This communication may include captured data by the first device, as well as a message or other notification. Privacy settings by the vehicle's operator may determine whether the vehicle's unique identifier may identify the second device and allow for direct communications, or whether the unique identifier may keep the operator as anonymous and/or cause a service provider to process the message data to determine whether the message is transmitted to the second device. Additionally, the observer's first device may be used to process a transaction to assist the vehicle's operator, such as a payment for parking, where reimbursement may be requested from the second device and/or processed using an account of the second device with the service provider.

In order to provide wireless signaling that may be used to identify a vehicle and therefore a device associated with the vehicle so that an operator of the vehicle may be notified of vehicle issues or hazards, a first user's device may include a wireless transceiver and additional data detection and recording components. The first user may correspond to another vehicle operator, bystander, or other person that observes a vehicle and notices an issue with vehicle operation, use, or storage, such as a financial issue due to insufficient fees paid by the vehicle owner or a hazard during operation of the vehicle. The first user's device may therefore include the wireless transceiver component, such as a communication module, that may communicate with other nearby devices through wireless signaling when the other devices are within a wireless proximity range of the first user's device (e.g., a radius or other distance from the first user's device). The wireless transceiver may further include directional wireless signaling capabilities, which may be used to point a specific part or component of the first user's device toward a direction and direct signaling in that direction. Thus, the wireless transceiver may be capable of being directed in a specific direction for wireless communications with devices in that direction (e.g., within the line-of-sight). This signaling may be done through WiFi, Bluetooth, Bluetooth Low Energy (BLE), infrared, or other types of signaling that provide directional communication capabilities.

The first user's device may further include additional components that may capture information about the vehicle that the first user is targeting for communication, such as a GPS locator or other location detection component that may determine a geo-location of the device and/or a route traveled by the device. The device may also include a compass functionality or other application or instrument for navigation, including gyroscopes and/or accelerometers. The first user's device may utilize one or more additional components and sensors, such as a camera or other visual or optical capture device, to capture data of the vehicle at the location and identify the vehicle. Additionally, the device may include a microphone and audio recording process, as well as an audio processing feature to process voice input, such as a voice-to-text process. The first user's device may also include a transceiver that may allow for wireless communications with one or more other devices or servers, including over cellular communications (e.g., 3G, 4G, 4G Long Term Evolution (LTE), 5G, other $3^{rd}$ Generation Partnership Project (3GPP)-based cellular communications), or other types of wireless communications.

The vehicle may include a wireless transceiver unit that may store a unique identifier or identification token for the vehicle that allows other devices to uniquely identify the vehicle for communications. The token may further be generated for the vehicle specifically and so that an identity of the vehicle's operator (e.g., a second user associated with the vehicle) remains anonymous (i.e., the token does not permit identification of the vehicle's operator and/or the operator's device directly) if so desired by the user. For example, the token may include a randomly generated identifier or obscured identifier for the second user associated with the vehicle that does not permit direct contact with the second user. The token may be generated when the second user opts-in to a service provided by a service provider that allows for communication by other observers of the vehicle (e.g., the first user) for reporting of vehicle issues. When the second user opts-in to the service, the service provider may allow the second user to establish privacy preferences, such as whom, when, or why the second user may be contacted regarding the second user's vehicle. Thus, the token may be generated based on such preferences. The token may be stored on a device for the second user, such as a mobile computing device, or may be stored on a device for the vehicle, such as a console or on-board computing device, vehicle wireless locking component, vehicle communication module, or other device. Additionally, a wireless transceiver may be added to or mounted on the vehicle, which may store the token. Thus, the vehicle may include a wireless transceiver having an antenna to communicate with the first user's device, and used to transmit the token to the first user's device.

The first user's device may transmit a signal through wireless communications to the vehicle's device, which may be directionally transmitted in a certain direction or location for receipt by the vehicle's device. When establishing a connection, the first user's device may emit a communication signal, which may include a query or request for the data token from the vehicle's device. The receiving device may execute specialized hardware and/or software to respond to the wireless communications, for example, through a communication module. This may be done passively utilizing an "always-on" type signal, or may be performed actively by an application of the device. When the vehicle's device detects the signal, the device may respond with the token. Additionally, the devices may establish a connection, where the connection may further enable the device to communicate additional information and/or determine distances through a received signal strength indications (RSSI) (e.g., Bluetooth RSSI), and/or exchange additional information. The token may keep the second user anonymous to prevent identification by the first user's device, and therefore does not directly identify the second user or the second user's device (e.g., the vehicle's device).

Where directional wireless communications are not used to detect multiple vehicle devices and associated tokens, additional data may also be used to determine a particular vehicle targeted by the first user for communication and notification of a vehicle issue. In order to identify the particular vehicle, the first user's device may capture additional data using a data detection component. For example, an image of the vehicle may be captured, a location of the first user's device may be determined, an orientation of the first user's device may be determined (e.g., using a compass, accelerometer, and/or gyroscope), and/or voice input by the first user may be recorded. Such data may be processed to determine the specific vehicle, for example, through image recognition of the vehicle with voice-to-text identification of the vehicle (e.g., if the user requests to identify the "white car" or the "pickup truck"). Additionally, a location of the device, direction the device is oriented, and/or image may be compared to all the tokens received to identify the particular vehicle (e.g., by determining that the device is pointed at a "truck" where three received tokens include only one for a truck). The first user's device may include an application with processing capabilities to identify the vehicle, or may detect the data and transmit the data to a service provider for processing. Thus, if the vehicle includes a color, shape, light, license plate, or visible QR/bar-code, the first user's device and/or service provider may identify the vehicle through such identifying characteristics, optical recognition, voice data processing, and location/orientation of the device. Such data may be used to hone in on the specific vehicle and identify that vehicle's token. Where the first user's device communicates locally with a vehicle's communication component using communications (e.g., WiFi, Bluetooth, or BLE), the first user's device may utilize RSSI, geo-location information, camera data, or other data in the signals received over the communications to determine the specific vehicle.

In various embodiments, a self-driving vehicle may also capture data of a nearby vehicle that is used to determine identification of the nearby vehicle and/or an issue with the nearby vehicle. Self-driving vehicles may be equipped with various sensors, including cameras and other optical detection and recognition components, distance sensors, speedometers or other acceleration/velocity detection components, and other sensors that may assist in operating a vehicle without or with minimal interaction by a user. These components may also be used to detect issues with other nearby vehicles, including operational issues (e.g., a flat tire, open gas tank, or other issue that may affect operation of the vehicle). The sensors may also be used to determine issues with use of the vehicle, including speed (e.g., driving too fast or slow), swerving or driving unsafely, operating in the wrong lane or side of the road, etc. Moreover, the self-driving vehicle may also detect issues with vehicles that are not in operation, including expired parking for parked vehicles or other issues that may affected a parked vehicle. Using this information, the self-driving vehicle may utilize wireless communications and/or vehicle sensors to determine an identity of the problematic nearby vehicle (e.g., the white sedan, black Toyota®, or green Camry®), and may alert the operator or owner of the self-driving vehicle of the issue and the identification of the problematic vehicle. For example, the self-driving vehicle may present a message on a display and/or an audio output that includes identification of the vehicle at issue and the issue (e.g., "The white sedan ahead has a flat tire," and additional options or advice including "Proceed with caution!" or "Would you like to alert the white sedan of the flat tire?"). The self-driving vehicle may then allow the operator/owner to contact the problematic vehicle, as discussed herein.

After receiving the identifier for the vehicle, the first user's device may be able to communicate with the device associated with the second user for the vehicle, (e.g., the vehicle's console, on-board, or smart-car device, or a computer device associated with the vehicle's operator, such as a mobile phone). Since the second user may wish to remain anonymous to communications from other users that are associated with the vehicle, the token may prevent identification directly of the second user, such as a phone number, name, or messaging identifier. Instead, the token may be utilized by an application of the first user's device and/or a service provider to direct communications to the second user's device while keeping the second user anonymous, for example, by preventing identification of the second user to the first user. The application of the first user's device may obscure a name and identifier of the second user but allow communication through the token, or a service provider may utilize the token to route communications. Additionally, communications from the first user may remain anonymous to the second user so that the first user's name or device identifier is also hidden from viewing by the second user.

A message from the first user may then be sent to the second user's device utilizing the token. The message may include message content, such as text that identifies the issue. The text may be entered through a voice-to-text process or may be directly input. The message may also include other notification data that is captured by the first user's device, such as an image, location, time, or other contextual information that may assist the second user in identifying and resolving the issue. The message may be transmitted based on the privacy preferences and settings of the second user. For example, the second user may only allow emergency messaging that identifies a hazardous condition, or may allow more relaxed standards for messaging including if a meter is about to expire. Thus, the message data may be processed by the first user's device and/or the service provider to determine message content. In certain embodiments, the first user may be required to select one or more fields or subjects for the message utilizing an interface of the application transmitting the message, which may be used to determine the message content. In certain embodiments, the message may also or instead be transmitted to the service provider or an authority entity for processing, for example, in the case of unsafe driving, breaking of laws, inebriated/drunk driving concerns, or other potential driver-based issues of the vehicle that may require another entity to intervene.

The first user's device and/or the service provider may also communicate directly with the vehicle's device where the vehicle's device may provide system monitoring, such as an on-board computing device or smart-car device. This may allow the device/service provider to determine whether the issue has been resolved prior to transmitting the message. The first user's device may also be used to process a transaction on behalf of the second user for the vehicle using the vehicle token and/or a nearby device or networked system. For example, if the vehicle is parked in an area where their parking fee or meter is set to expire, the first user may provide a payment on behalf of the second user for the vehicle. The service provider system may process the transaction, and may request reimbursement from the second user or may directly withdraw the funds from an account of the second user. The service provider may process transaction data and available vehicle data captured for the vehicle in order to ensure that a payment was required, and may provide a reimbursement process for the first user after providing the payment.

The service provider may also monitor message content to prevent the transmission of unwanted messages, such as spam messages that do not contain relevant vehicle information and/or abusive messages by users. The service provider may utilize text keyword analysis and/or other data processing to determine the message content and whether the message violates terms that the users agree to when opting in to the service provider's messaging service. Additionally, the service provider may provide a reporting service, which may allow the second user to report the first user, and vice versa, for harassing or unwanted messaging. The reporting service may be used during future message content processing to determine whether the first or second user may message another user, and may place restrictions, blacklists, or bans on messaging for the first or second user based on the reports.

Thus, the processes described herein may be used to directly identify a vehicle through directional wireless communication and additional captured data. A token stored in a device may be retrieved by a device of another user that observes an issue with the vehicle, and may be used for anonymous communication. Utilizing data processing for data captured by the device, the specific token for the vehicle may be determined even where multiple tokens may be accessible. This allows for instantaneous direct communication with the device for the vehicle operator while maintaining anonymous communications preventing identification of unknown entities and devices. Additionally, a service provider may maintain device anonymity and provide data processing to prevent unwanted communications.

Figure 1:
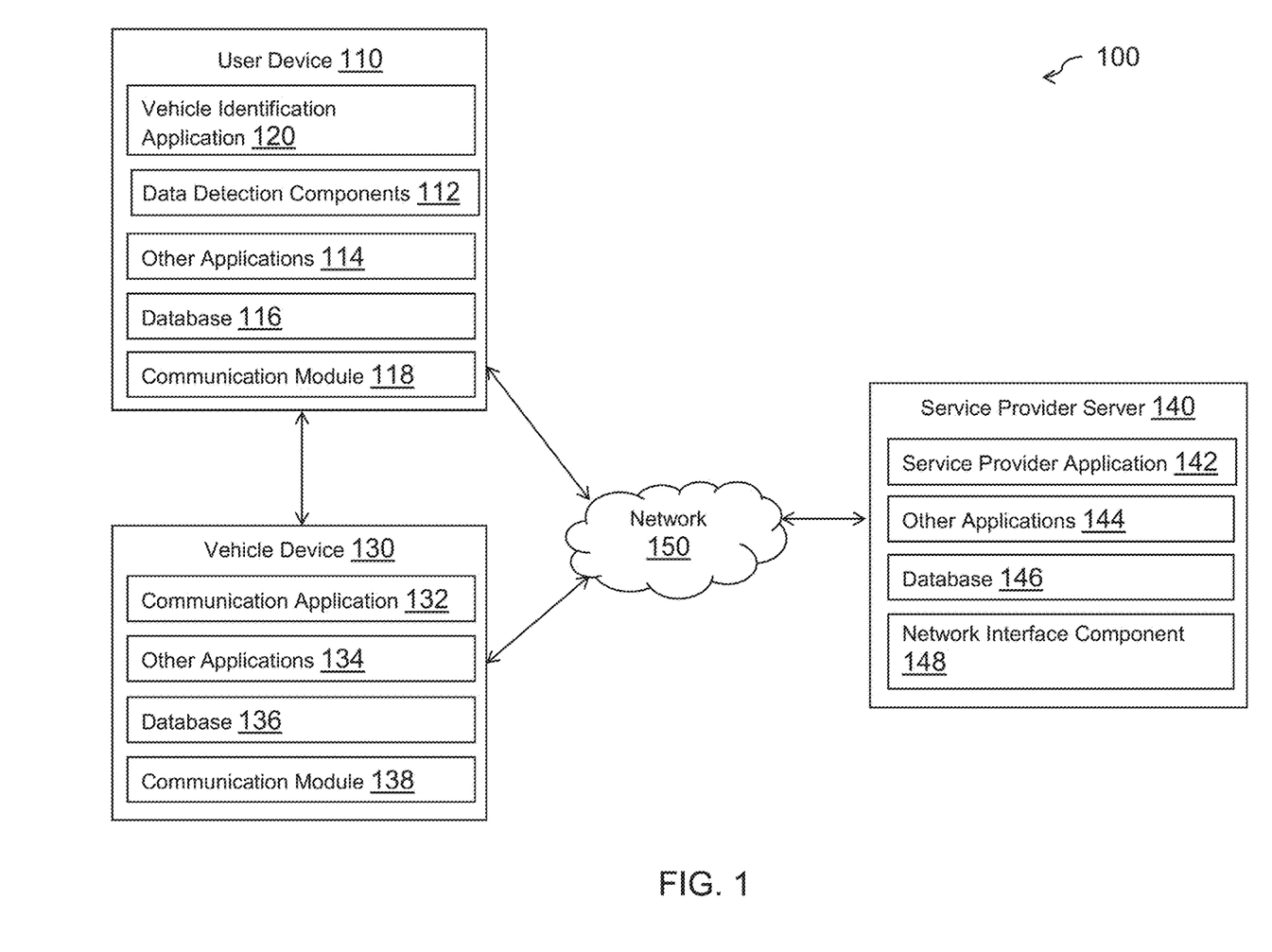
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a vehicle device 130, and a service provider server 140 in communication over a network 150. User device 110 may be utilized by a user to capture data from vehicle device 130 and/or another device associated with a vehicle in order to message vehicle device 130 about an pending issue with the vehicle. User device 110 may retrieve a token for vehicle device 130, which may allow user device 110 and vehicle device 130 top communicate anonymously. User device 110 may capture additional information that may be used by user device 110 and/or service provider server 140 for the identification of the token for vehicle device 130. Additionally, service provider server 140 may also be used for communication services, transaction processing, and message processing.

User device 110, vehicle device 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with vehicle device 130 and/or service provider server 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may also include or correspond to a device for a vehicle, including a self-driving vehicle operational system, a vehicle console device, a computing system managing a heads-up-display for a vehicle, or other device connected to or included with a vehicle. Although a communication device is shown, the communication device may be managed or controlled by any suitable processing device. Although only one communication device is shown, a plurality of communication devices may function similarly.

User device 110 of FIG. 1 contains a vehicle identification application 120, data detection components 112, other applications 114, a database 116, and a communication module 118. Vehicle identification application 120 and other applications 114 may correspond to executable processes, procedures, and/or applications with associated hardware. In other embodiments, user device 110 may include additional or different modules having specialized hardware and/or software as required.

Vehicle identification application 120 may correspond to one or more processes to execute modules and associated software/hardware of user device 110 to determine an identification of a vehicle associated with vehicle device 130 using wireless signaling and other data captured by user device 110, and transmit a message to vehicle device 130 based on a vehicle condition observed by a user associated with user device 110. In this regard, vehicle identification application 120 may correspond to specialized software utilized by user device 110 to first establish a wireless communication channel with vehicle device 130 and/or another device associated with a vehicle for the exchange of information, including the retrieval of digital token stored on the device. The digital token may allow for communication between user device 110 and vehicle device 130, which may further be anonymous to protect the parties privacy based on privacy settings. Vehicle identification application 120 may utilize communication module 118 to provide wireless communications with the device having the token, which may be directional and configured to communicate with devices in a specific direction in which a component of user device 110 is pointed. Once connected with the device, vehicle identification application 120 may retrieve the token.

Vehicle identification application 120 may capture multiple tokens, and require vehicle identification to communicate with vehicle device 130. Thus, vehicle identification application 120 may capture additional information using data detection components 112, such as a location, images of the vehicle, a navigational direction or orientation of user device 110, and/or voice data. Vehicle identification application 120 may utilize the tokens and additional data to identify the vehicle and thus the correct token for the vehicle. For example, the additional data may be used to identify a vehicle (e.g., through an image of a "white van" and/or word analysis of voice data), and data for the token may be associated with the vehicle (e.g., a "white van" descriptor with the token). In other embodiments, service provider server 104 may provide such processing. Vehicle identification application 120 may the use the token to communicate with vehicle device 130, including transmission of a message.

Vehicle identification application 120 may further utilize one or more sensors to detect an issue with the vehicle associated with vehicle device 130 without requiring user input or action. For example, vehicle identification application 120 may correspond to one or more applications or processes used by a self-driving vehicle in order to operate the self-driving vehicle. During self-driving operations, vehicle identification application 120 may detect an issue in a nearby in-use or parked vehicle, such as an open window, door, or gas tank that may present an issue, a vehicle operational hazard (e.g., a flat tire), or a usage problem (e.g., swerving). Vehicle identification application 120 may utilize the aforementioned processes to identify the vehicle based on the detected vehicle condition and vehicle information, and may output a warning of the issue to an owner/operator of the self-driving vehicle. With the warning, vehicle identification application 120 may allow the owner/operator of the self-driving vehicle to utilize vehicle identification application 120 and the determined identifier in order to contact vehicle device 130. A message transmitted by vehicle identification application 120 to vehicle device 130 may include a warning or alert of the issue. Vehicle identification application 120 may also or instead contact another authority with identification of the vehicle and issue (e.g., the police if the vehicle is driving unsafely or is left with an unsafe condition, such as open windows when parked).

Vehicle identification application 120 may be used to opt-in to messaging services based on vehicle identification and conditions detected by other users (e.g., observers). When opting-in, vehicle identification application 120 may be used to establish messaging and privacy settings, which may indicate what messages are accepted to send/receive, and whether the communications are anonymous or who may receive identification information of the user associated with user device 110. Vehicle identification application 120 and/or service provider server 140 may analyze a message input by the user associated with user device 110 for vehicle device 130, and may determine whether to transmit the message based on preferences or settings. Additionally, vehicle identification application 120 may be used to receive feedback, such as approvals or "likes" from other users based on messages, reports or warnings based on unsolicited or harassing messages, and/or system restrictions based on unwanted messaging.

Vehicle identification application 120 may also allow a user to process transactions for the vehicle associated with vehicle device 130, for example, to provide compensation for required vehicle services when the operator of the vehicle is absent. Thus, vehicle identification application 120 may utilize a personal account accessible through vehicle identification application 120 to initiate, receive, and/or process/complete transactions using services using service provider server 140. Where the account established by vehicle identification application 120 corresponds to a private or personal account for a user, vehicle identification application 120 may be implemented as a user interface enabling the user to enter payment instruments for use in a digital wallet that provides transaction processing services. Vehicle identification application 120 may be utilized to select payment instrument(s) for use during a transaction between the user and another entity. Vehicle identification application 120 may utilize the digital wallet and/or user financial information for the personal account, such as a credit card, bank account, or other financial account, as a payment instrument when processing a transaction and/or transferring funds. Vehicle identification application 120 may be utilized to view the results of the transaction and/or for viewing and storage of a transaction history, such as a receipt.

Data detection components 112 correspond to a hardware and/or software feature of user device 110 that assists in capturing data associated with a vehicle for use in determining a specific vehicle during multi-vehicle presence, and therefore determine a vehicle token for use in communicating with a device for the vehicle (e.g., vehicle device 130). In certain embodiments, data detection components 112 may include a location detection component capable of detecting a location of user device 110, for example, through a GPS locator and service, triangulation process, mapping application, check-in process/feature, wireless communications, or other location detection process. Data detection components 112 may be used to determine a location of user device 110, which may be utilized to determine nearby vehicles and devices having vehicle tokens. Moreover, the location for user device 110 that may be determined by data detection components 112 may be shared with, provided to, or utilized by service provider server 140 when determining vehicle device 130 for communication with user device 110 and/or message information for vehicle device 130.

In various embodiments, data detection components 112 may include a camera, which corresponds to an optical device of user device 110 enabling user device 110 to capture or record images, including still and/or video images. Data detection components 112 may correspond to a digital camera on user device 110 (e.g., incorporated in user device 110 such as a mobile phone's digital camera in a traditional camera orientation and/or a forward facing camera orientation that captures one or more users as they use and view a display screen of user device 110) or associated with user device 110 (e.g., connected to user device 110 but not incorporated within a body or structure of user device 110), or may more generally correspond to any device capable of capturing or recording an image, video, or other digital media data, including infrared imaging or other types imaging devices. As a digital camera, data detection components 112 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of data detection components 112 may include various features, such as zoom, flash, focus correction, shutter speed controls, or other various features usable to capture one or more images or videos of the user and/or other users or objects.

Data detection components 112 may include other media capture components, including a microphone to capture audio data. A microphone of data detection components 112 may be used to capture voice data, which may be processed to determine particular vehicle identifying information, such as vehicle descriptors (e.g., name, make, model, color, type, etc.) and/or license plate numbers. Such data may be compared to camera images to determine a specific vehicle of interest and therefore retrieve and utilize that vehicle's digital token. Data detection components 112 may further include a navigational component and/or application, such as a compass, as well as a gyroscope, accelerometer, or other component that may detect an orientation of user device 110 to determine a specific direction that user device 110 is being pointed in, and a vehicle and/or device having a vehicle token in that incident direction. Data detection components 112 may also include or be connected to components and sensors utilized with self-driving vehicles, such as cameras used to capture views around a vehicle and used to operate the vehicle, speed sensors, distance sensors, and other components.

Data detection components 112 may include peripherals and/or attachable devices that may be connected through one or more ports or wired/wireless connections and used to capture data for determination of a specific vehicle for retrieval of the vehicle's token and communication with vehicle device 130. For example, data detection components 112 may include or be associated with attachable dashboard cameras, speed detection components relative to user device 110 and/or vehicle, distance sensors, and/or connectable mobile devices. Data detection components 112 may also include software components that may interact with the hardware components to facilitate data determination, such as camera controllers and processes to determine an RSSI for vehicle location determination.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150, including messaging utilized by vehicle identification application 120. In various embodiments, other applications 114 may include financial applications, such as banking applications and/or transaction processing application that may be utilized by vehicle identification application 120 during transaction processing for a service utilized by a vehicle associated with vehicle device 130. Other applications 114 may also include other location detection applications, which may be used to determine a location for user device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with vehicle identification application 120 and/or other applications 114, identifiers associated with hardware of user device 110, or other appropriate identifiers, such as identifiers used for payment/user/device authentication or identification, which may be communicated as identifying the user/user device 110 to vehicle device 130 and/or service provider server 140. Moreover, received identifiers may be stored in database 116 with other data detected by user device 110 that may allow identification of a vehicle associated with vehicle device 130. Such data may also include messages and other content to transmit to vehicle device 130.

User device 110 includes at least one communication module 118 adapted to communicate with vehicle device 130, service provider server 140, and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications, for example, to detect nearby devices and/or request data from nearby devices, such as a digital token used for vehicle identification. Additionally, communication module 118 may provide directional wireless communication capabilities, such as signal beam that may be directed at a particular device or in a particular direction.

Vehicle device 130 may be implemented as a communication device that may utilize appropriate hardware and software configured for wired and/or wireless communication with user device 110 and/or service provider server 140. For example, in one embodiment, vehicle device 130 may be implemented as a console device or onboard computing device within vehicle device 130. Vehicle device 130 may also correspond to a device used by a user inside a vehicle or associated with a vehicle (e.g., a user that is remote from the vehicle but may receive messages based on a condition of the vehicle), such as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly.

Vehicle device 130 of FIG. 1 contains a communication application 132, other applications 134, a database 136, and a communication module 138. Communication application 132 and other applications 134 may correspond to executable processes, procedures, and/or applications with associated hardware. In other embodiments, vehicle device 130 may include additional or different modules having specialized hardware and/or software as required.

Communication application 132 may correspond to one or more processes to execute software of vehicle device 130 to receive communications from user device 110 and respond to the communications. In certain embodiments, communication application 132 may also be utilized in conjunction with database 136 and communication module 138 to provide a digital token identifying a vehicle and vehicle device 130 for communications based on a condition of the vehicle. However, in other embodiments, another device or vehicle component may be configured to provide such data in response to a query from user device 110, such as a beacon or dongle attached to or included within a vehicle, a wireless automated system for the vehicle (e.g., a wireless door locking system), a smart car component, or other on-board device or component for a vehicle. After determination of vehicle device 130 by user device 110 and/or service provider server 140 for the receipt of messages, communication application 132 may receive such messages concerning an issue of condition of the vehicle associated with vehicle device 130.

In this regard, communication application 132 may correspond to specialized hardware and/or software utilized by vehicle device 130 to output messages through one or more application interfaces using a graphical user interface (GUI) of vehicle device 130. Communication application 132 may receive a message based on the vehicle and output the message. In certain embodiments, communication application 132 may include privacy and messaging preferences to determine whether to output the message based on the message content, which may include processes to determine message content (e.g., keyword search/analysis, image recognition, etc.). Communication application 132 may further receive input for feedback back to user device 110, such as a reply message, thanks or "like," report or dislike," a reimbursement for a processed transaction, or other message. Communication application 132 may also be used to report user device 110 and/or a user to service provider server 140, for example, based on unwanted messages, and may also be used to see a rating for vehicle device 130 and/or the operator associated with vehicle device 130 based on responses by other users.

In various embodiments, vehicle device 130 includes other applications 134 as may be desired in particular embodiments to provide features to vehicle device 130. For example, other applications 134 may include security applications for implementing client-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150, which may be utilized with communication applicant 132 where necessary. In various embodiments, other applications 134 may include financial applications, such as banking applications and electronic transaction processing applications to provide reimbursement for transactions processed by user device 110. Other applications 134 may also include other location detection applications, which may be used to determine a location for the user, such as a mapping, compass, and/or GPS application, which can include a specialized GPS receiver that obtains location information for vehicle device 130 and determines whether vehicle device 130 is nearby a vehicle. Such information may be provided to user device 110 and/or service provider server 140 for a response to a message. Other applications 134 may include device interface applications and other display modules that may receive input from the user and/or output information to the user. For example, other applications 134 may contain software programs, executable by a processor, including a graphical user interface (GUI) configured to provide an interface to the user. Other applications 134 may therefore use devices of vehicle device 130, such as display devices capable of displaying information to users and other output devices, including speakers.

Vehicle device 130 may further include database 136 stored in a transitory and/or non-transitory memory of vehicle device 130, which may store various applications and data and be utilized during execution of various modules of vehicle device 130. Database 136 may include, for example, identifiers such as operating system registry entries, cookies associated with communication application 132 and/or other applications 134, identifiers associated with hardware of vehicle device 130, or other appropriate identifiers, such as identifiers used for payment/user/device authentication or identification, which may be communicated as identifying vehicle device 130 to user device 110 and/or service provider server 140, such as a digital token that allows for communication with vehicle device 130. In various embodiments, database 136 may also store received messages.

Vehicle device 130 includes at least one communication module 138 adapted to communicate with user device 110 and/or service provider server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with nearby devices using wireless communications, such as Bluetooth Low Energy, LTE Direct, WiFi, radio frequency, infrared, Bluetooth, and near field communications.

Service provider server 140 may be maintained, for example, by an online service provider, which may provide routing information to user device 110 for connection with vehicle device 130. In this regard, service provider server 140 includes one or more processing applications which may be configured to interact with user device 110, vehicle device 130, and/or another device/server to facilitate communications and transactions between users based on data captured by one of the user. In one example, service provider server 140 may be provided by PAYPAL®, Inc. of San Jose, Calif., USA. However, in other embodiments, service provider server 140 may be maintained by or include another type of service provider, which may provide connection services to a plurality of users.

Service provider server 140 of FIG. 1 includes a service provider application 142, other applications 144, a database 146, and a network interface component 148. Service provider application 142 and other applications 144 may correspond to executable processes, procedures, and/or applications with associated hardware. In other embodiments, service provider server 140 may include additional or different modules having specialized hardware and/or software as required.

Service provider application 142 may correspond to one or more processes to execute modules and associated specialized hardware of service provider server 140 to provide a service to user device 110, which may be accessed through one or more applications of user device 110, for example, vehicle identification and communication processing services. In this regard, service provider application 142 may correspond to specialized hardware and/or software to receive an identification request of a vehicle and determination of a digital identity token for the vehicle based on received token(s) and additional data of the vehicle, such as captured images, voice data, directional or device orientation information, and/or a location or direction of travel. Service provider application 142 may process the additional data to identify a vehicle that user device 110 is targeting for communication, and identify one of the tokens based on additional vehicle descriptors associated with the token (e.g., contained within the token or retrievable using the token). Service provider application 142 may provide the selected token to user device 110 for confirmation with vehicle information and communication with vehicle device 130, and/or may utilize the token to route messages from user device 110 to vehicle device 130. Additionally, service provider application 142 may utilize messaging and privacy settings to determine whether to send messages between user device 110 and vehicle device 130, as well as what identity information to reveal to user device 110 and vehicle device 130. In other embodiments, user device 110 may provide such processing.

In certain embodiments, service provider application 142 may be used to receive and/or transmit information for processing and completing of one or more transactions paid for by an account associated with user device 110 for a vehicle associated with vehicle device 130, as well as process reimbursements to the account. The user associated with user device 110 may establish a payment account with service provider application 142 by providing personal and/or financial information to service provider server 140 and selecting authentication credentials. In various embodiments, the financial information may include payment instrument information, such as account numbers. The account may be used to send and receive payments. The payment account may be accessed and/or used through a browser application and/or dedicated payment application executed by user device 110. Service provider application 142 may receive a payment request from user device 110 for a transaction by the account to a service provider providing a vehicle service (e.g., parking, tolls, etc.) to the vehicle, which may include identifiers, tokens, or other data used for transaction processing. Service provider application 142 may process a payment, and may provide a transaction history to user device 110 and/or vehicle device 130.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing service provider server 140, where the user or other users may interact with the GUI to more easily view and communicate information. In various embodiments, other applications 144 may include additional connection and/or communication applications, which may be utilized to communicate information to over network 150.

Additionally, service provider server 140 includes database 146. Database 146 may store various identifiers associated with user device 110 and/or vehicle device 130. Database 146 may also store account data, including payment instruments and authentication credentials, as well as transaction processing histories and data for processed transactions. Database 146 may store received digital tokens for vehicle communications and additional data for selected vehicles that users request identification of for the communications. Additionally, database 146 may store opt-in preferences and privacy/messaging settings with exchanges messages between devices.

In various embodiments, service provider server 140 includes at least one network interface component 148 adapted to communicate user device 110 and/or vehicle device 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
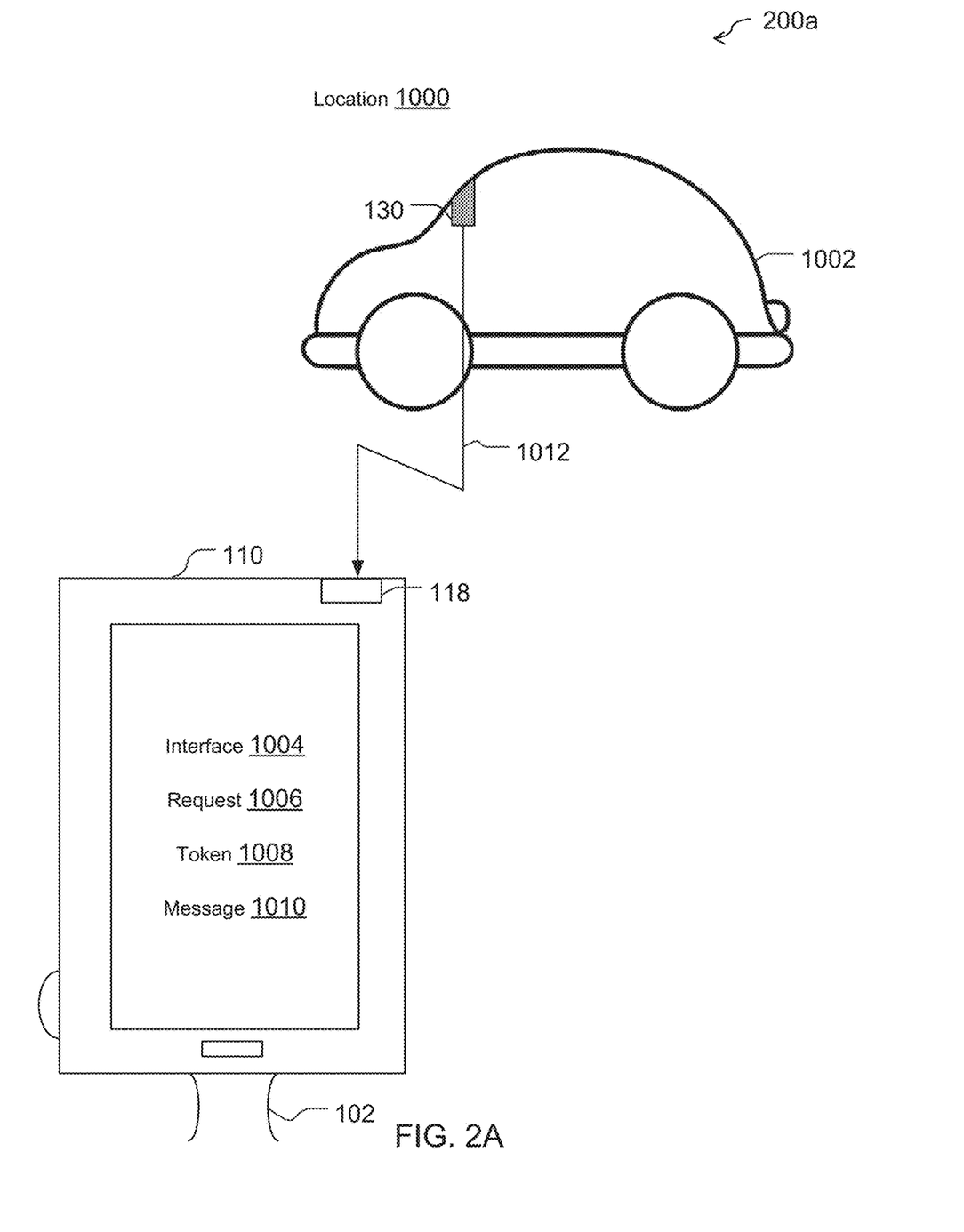
FIG. 2A is an exemplary real-world environment for directional wireless communication for vehicle identification and device communication, according to an embodiment.

FIG. 2A is an exemplary real-world environment for directional wireless communication for vehicle identification and device communication, according to an embodiment. Environment 200a of FIG. 2A includes user device 110 and vehicle device 130, discussed in reference to system 100 of FIG. 1. In this regard, user device 110 is associated with a user 102 observing an issue with a vehicle 1002 that is associated with vehicle device 130 to provide a digital token and/or display messages from user device 110.

In order to provide communications between two devices unknown to each other, such as user device 110 and vehicle device 130, wireless communications may be used to retrieve an identifier that allows for communications (which may or may not be anonymous) between devices. In this regard, user 102 may utilize user device 110 to exchange signaling with vehicle device 130 at a location 1000 to retrieve the identifier or token stored to vehicle device 130 when user 102 observes an issue with vehicle 1002 at location 1000. User 102 may "point" or direct user device 110 toward vehicle 1002 as shown in environment 200a, where communication module 118 may emit a directional wireless communication signal 1012 that establishes a communication pathway with vehicle device 130 and retrieves the token from vehicle device 130. Directional wireless communication signal 1012 may query vehicle device 130 for the token, for example, using an established protocol, query, and/or identification/authentication mechanism utilized by the system for communications with vehicle device 130. In various embodiments, user device 110 may capture further information as user device 110 is directed at vehicle 1002, such as an image, voice data, and/or an orientation of user device 110.

After retrieval, this token may then be processed by user device 110 to determine vehicle device 130 for communication regarding vehicle 1002. User device 110 may display an interface 1004, where interface 1004 may display information identifying vehicle 1002 (e.g., an image, license plate, description, etc.). Interface 1004 may also be used to submit a request 1006 for communication with vehicle device 130, which may include the retrieved token 1008 for communication with vehicle device 130 and a message 1010. Message 1010 may then be sent to vehicle device 130 using token 1008, which may be pre-processed to determine message content and appropriateness for delivery.

Figure 2B:
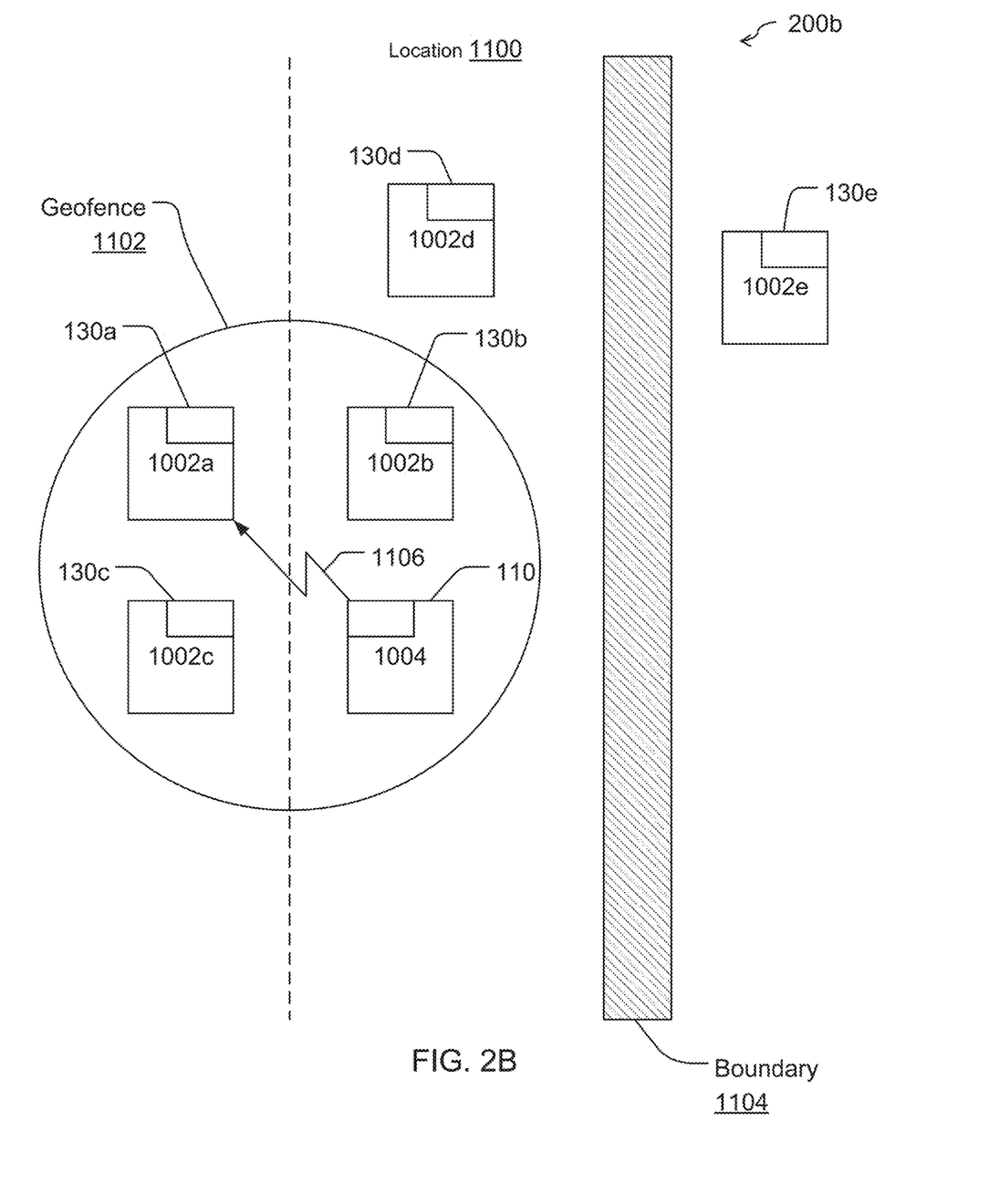
FIG. 2B is an exemplary real-world environment for vehicle identification and device communication where multiple vehicles are operating in close proximity, according to an embodiment.

FIG. 2B is an exemplary real-world environment for vehicle identification and device communication where multiple vehicles are operating in close proximity, according to an embodiment. Environment 200b of FIG. 2B includes user device 110, discussed in reference to system 100 of FIG. 1. Environment 200b further includes a vehicle device 130a, a vehicle device 130b, a vehicle device 130c, a vehicle device 130d, and a vehicle device 130e all corresponding generally to the features and processes executed by vehicle device 130 discussed in reference to system 100 of FIG. 1. In this regard, user device 110 may be located in a vehicle 1004 and may be surrounded by a vehicle 1002a, a vehicle 1002b, a vehicle 1002c, a vehicle 1002d, and a vehicle 1002e each having one of vehicle devices 130a-e. User device 110 may be targeting vehicle device 130a in vehicle 1002a for communications regarding an observed issue or condition of vehicle 1002a.

In environment 200b, a location 1100 includes multiple vehicles 1002a-e where user device 110 requires identification of vehicle 1002a from vehicles 1002a-e, where all of vehicle devices 130a-e may provide their respective vehicle identification token to user device 110. In order to identify vehicle device 130a for vehicle 1002a that user device 110 is attempted to retrieve a token and communicate with, user device 110 may determine additional information. For example, a location of user device 110 may be determined, for example, using a GPS locator or other device. A geofence 1102 may then be established around user device 110 that may eliminate vehicle device 130d and 130e from being considered even if their tokens are retrievable based on being outside of geofence 1102. Further, a boundary 1104 may separate vehicle 1004 for user device 110 from vehicle 1002e for vehicle device 130e because they are travelling in opposite directions. Thus, due to the direction of travel, vehicle device 130e may also be eliminated as corresponding to vehicle device 130a that user device 110 is attempting to contact.

Additionally, directional data acquisition 1106 may capture direct data of vehicle 1002a corresponding to vehicle device 130a for identification of the token for vehicle device 130a. For example, directional data acquisition 1106 may include visual data capture, directional wireless signaling, and/or an orientation or direction of user device 110. Visual data capture by user device 110 may correspond to an image of vehicle 1002a, which may include a color, make, model, license plate number, or other identifying characteristic of vehicle 1002a. This data may be determined through image recognition processes and other image processing to identify specific visual data for vehicle 1002a. User device 110 may then process the determined visual data with token information that may identify visual characteristics of vehicle 1002a, such as the color, make, model, license plate number, etc.

In other embodiments, directional data acquisition 1106 may correspond to a directional wireless signal that is used to only capture the token for vehicle device 130a, such as line-of-sight directional wireless signaling. However, where the wireless signaling may be radiated uniformly around user device 110, a compass or orientation detection component (e.g., gyroscope or accelerometer) may determine an orientation of user device 110. An orientation may correspond to a direction that user device 110 is pointed in, which may be utilized to identify vehicle 1002a from vehicles 1002a-e. The orientation may be processed with geo-location data for vehicle 1002a, which may be provided with the token for vehicle device 130a and compared to geo-location data 110. This may allow identification of vehicle 1002a. The orientation may also be used with image data that may capture vehicles 1002b and 1002c within the image. The orientation may be used to identify vehicle 1002a based on the orientation of user device 110 and vehicles 1002a-c in the image. Thus, additional data captured by user device 110 may be used to identify vehicle 1002a and thus eliminate tokens for vehicle devices 130b and 130c from being utilized for communication. User device 110 may then communicate with vehicle device 130a based on the selected token.

Figure 3A:
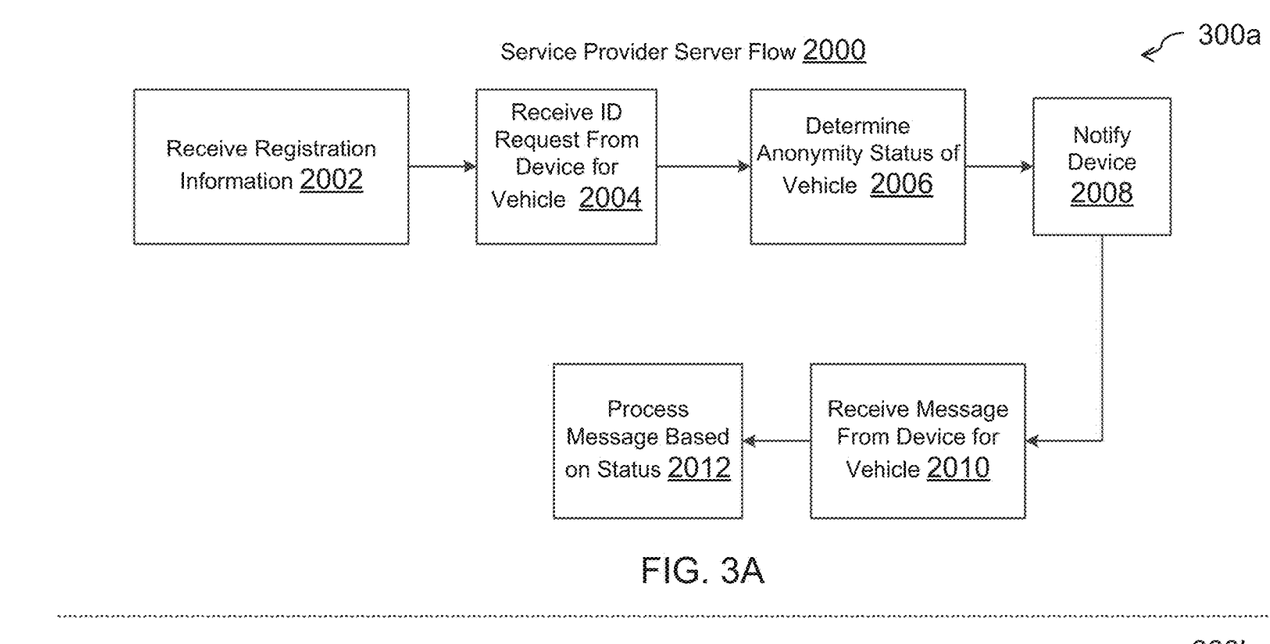
FIG. 3A is a flowchart of an exemplary process executed by a service provider for vehicle identification and device communication, according to an embodiment.

FIG. 3A is a flowchart of an exemplary process executed by a service provider for vehicle identification and device communication, according to an embodiment. Flowchart 300a includes an exemplary process by a service provider for communication between a user device of a user observing a vehicle and a device associated with that vehicle. Note that one or more steps, processes, and methods described herein may be omitted, performed in a different sequence, or combined as desired or appropriate.

In order to initiate device communications using a token identifying a particular vehicle, a device may initially be required to opt-in to sending and receiving communications with other devices, for example, by providing registration information at step 2002 of service provider server flow 2000. This may include establishment of registration information, privacy settings, and messaging preferences with the service provider for use of the service provider's messaging service. Additionally, this may cause generation of the vehicle's messaging identification token and establishment of that token on a device. At step 2004 of service provider server flow 2000, an identification request is received from a device for a vehicle, which may include identification of at least one token and additional data captured of the vehicle for identification of the specific vehicle and associated token. These steps may be performed by the service provider so that the service provider may determine the token used for messaging with the vehicle's device.

At step 2006 of service provider server flow 2000, an anonymity status may be determined for the vehicle, which may determine what identification data is shown to other devices when messaging the vehicle's device. Based on the anonymity status, the user's device that captures the token and data may be notified of whether messaging is accepted by the vehicle's device, as well as what messaging may be accepted, at step 2008 of service provider server flow 2000. At step 2010 of service provider server flow 2000, the service provider may then receive a message from the user's device for the vehicle, which may be output through the device associated with the vehicle. Thus, the vehicle's device is notified of the message and any additional data captured by the user's device that observes the vehicle based on the anonymity status, at step 2012 of service provider server flow 2000.

Figure 3B:
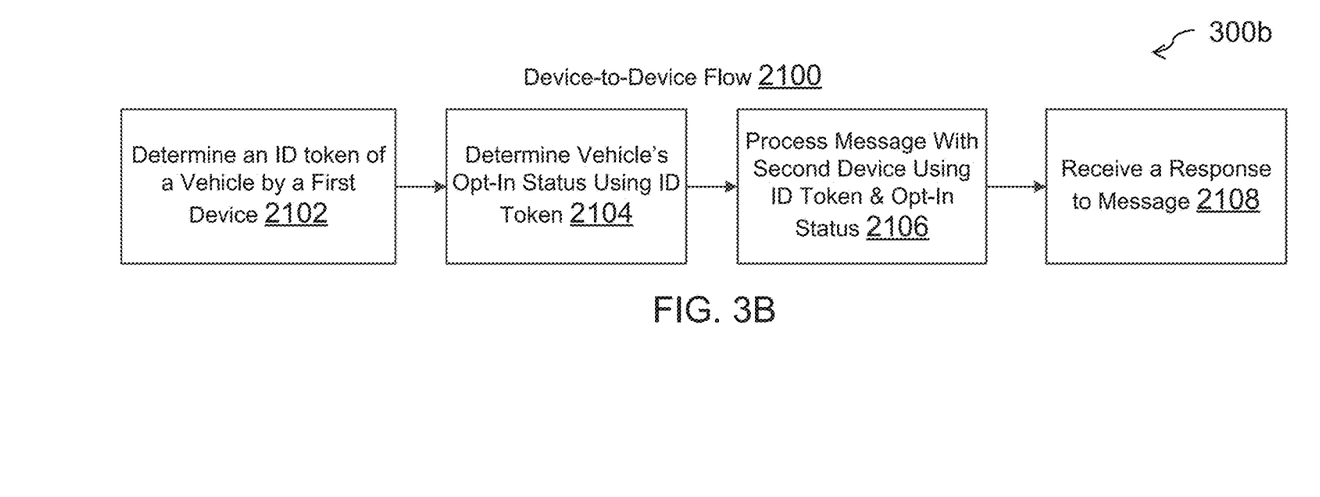
FIG. 3B is a flowchart of an exemplary process executed by a device for vehicle identification and device communication, according to an embodiment.

FIG. 3B is a flowchart of an exemplary process executed by a device for vehicle identification and device communication, according to an embodiment. Flowchart 300b includes an exemplary process by a service provider for communication between a user device of a user observing a vehicle and a device associated with that vehicle. Note that one or more steps, processes, and methods described herein may be omitted, performed in a different sequence, or combined as desired or appropriate.

In various embodiments, device-to-device communications may be performed without the use of a service provider for device notifications of a vehicle condition from another device. At step 2102 of device-to-device flow 2100, a first device may determine an identity token for a vehicle through wireless communications and analysis of additional data captured for the vehicle, such as voice data, images, and/or other data. The first device may the determine an opt-in status using the identity token, which may include whether the vehicle is opted-in to receiving communications from the first device, at step 2104 of device-to-device flow 2100. The status may also determine the communication and privacy preferences for messaging a second device associated with the vehicle.

Based on the opt-in status, a message may be processed with a second device using the identity token and the restrictions and preferences for the opt-in status, at step 2106 of device-to-device flow 2100. This may include sending the message, redacting or eliminating unwanted information, or refusing to send the message based on the message content. Additionally, the message may be processed to retain anonymity of the parties in the transmission. At step 2108 of device-to-device flow 2100, a response to the message may be received and may be output to on the first device.

Figure 4:
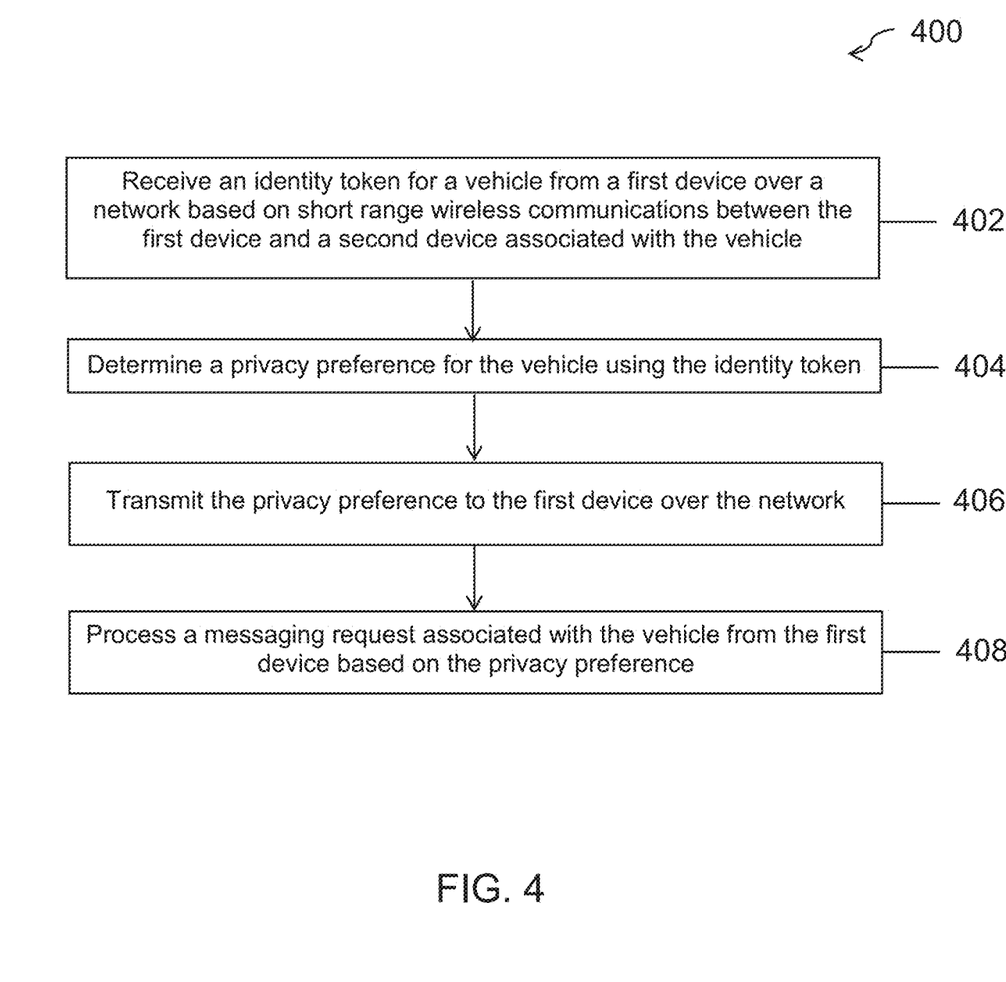
FIG. 4 is a flowchart of an exemplary process for vehicle identification and device communication through directional wireless signaling, according to an embodiment.

FIG. 4 is a flowchart of an exemplary process for vehicle identification and device communication through directional wireless signaling, according to an embodiment. Note that one or more steps, processes, and methods described herein may be omitted, performed in a different sequence, or combined as desired or appropriate.

At step 402 of flowchart 400, an identity token for a vehicle is received from a first device over a network through wireless communications between the first device and a second device associated with the vehicle. The first device may include a wireless transceiver for wireless communications, and the identity token may be received by the first device based on an identification request transmitted by the first device to a vehicle device, such as the second device or an on-board vehicle console device of the vehicle. The wireless transceiver may comprise one of a directional Bluetooth transceiver or a directional colorless laser transceiver, and the wireless signaling may establish a direct wireless link between the first device and the vehicle device. The token may uniquely identify the vehicle to a service provider receiving the token. The token may be sent by the vehicle device to the first device through wireless signaling and may, in certain embodiments, include a communication acceptance status for the vehicle. However, the communication acceptance status or other privacy preference may also be determined by the service provider using the token.

Prior to receiving the token, a user associated with the first device may provide an opt-in setting to a vehicle identification system for the first device, which may comprise privacy settings by the user with the vehicle identification system. Thus, an application on the first device may be configured to detect identity tokens from other devices for vehicles through the first device's wireless transceiver. The communication acceptance status and the privacy settings may include an anonymity setting. Additionally, the token may comprise a randomized token that prevents identification of a user associated with the vehicle and/or vehicle device.

In certain embodiments, a plurality of tokens may be detected by the first device, and an identification of the specific vehicle and device may be determined using at least one of a GPS location, a directional component of the wireless transceiver, a directional or orientation detection component of the first device, a user profile associated with the first device, voice data provided by the user to the first device, or an image captured by the mobile device. For example, an image may include an image of a license plate of the vehicle, a color of the vehicle, a name of the vehicle, a make of the vehicle, or a model of the vehicle. Other additional indicators of the vehicle may include a direction of travel associated with the first device, additional vehicles within a geo-fence around the vehicle, a direction of travel of the additional vehicles within the geo-fence, locations of the additional vehicles, a voice command recorded by the first device, or a polar orientation detected by a compass application of the first device. Thus, additional data detected by the first device may be received and used to determine the vehicle and thus the vehicle's identity token.

At step 404 of flowchart 400, a privacy preference for the vehicle is determined using the identity token. The privacy preference is transmitted to the first device over the network, at step 406 of flowchart 400. At step 408 of flowchart 400, a messaging request associated with the vehicle from the first device is processed based on the privacy preference. For example, the communication acceptance status or privacy preference may comprise a first opt-in setting by the vehicle device to receive communications from other devices, and the first device or the service provider may transmit a message to the vehicle device using the token. The processing may also include processing a transaction for the vehicle based on a location of the vehicle and transmitting a message associated with the transaction to one of the vehicle device based on the communication acceptance status or a service provider associated with the token. In further embodiments, a location of the vehicle may be determined using the first device, and an emergency notification may be transmitted to an additional device located within a geo-fence for the location.

The processing may also include receiving a message from the first device, wherein the message comprises identification of a vehicle issue associated with the vehicle. A service provider may then determine whether the vehicle issue is resolved using one of the second device or an on-board smart vehicle device of the vehicle and process the message based on the determining whether the vehicle issue is resolved. The processing the messaging request may also comprise transmitting a messaging identifier for the second device to the first device, wherein the messaging identifier allows for communications from the first device to the second device based on the privacy settings or preferences. However, where the processing comprises receiving a message, the service provider or an application on the first device may determine whether to send the message based on message content for the message. For example, text analysis may be performed on the message content, and it may be determined whether the message comprises one of an advertisement, a threat, or a spam message. This may also be determined using an account status, which may flag the account as abusive. If so the message may be blocked.

Figure 5:
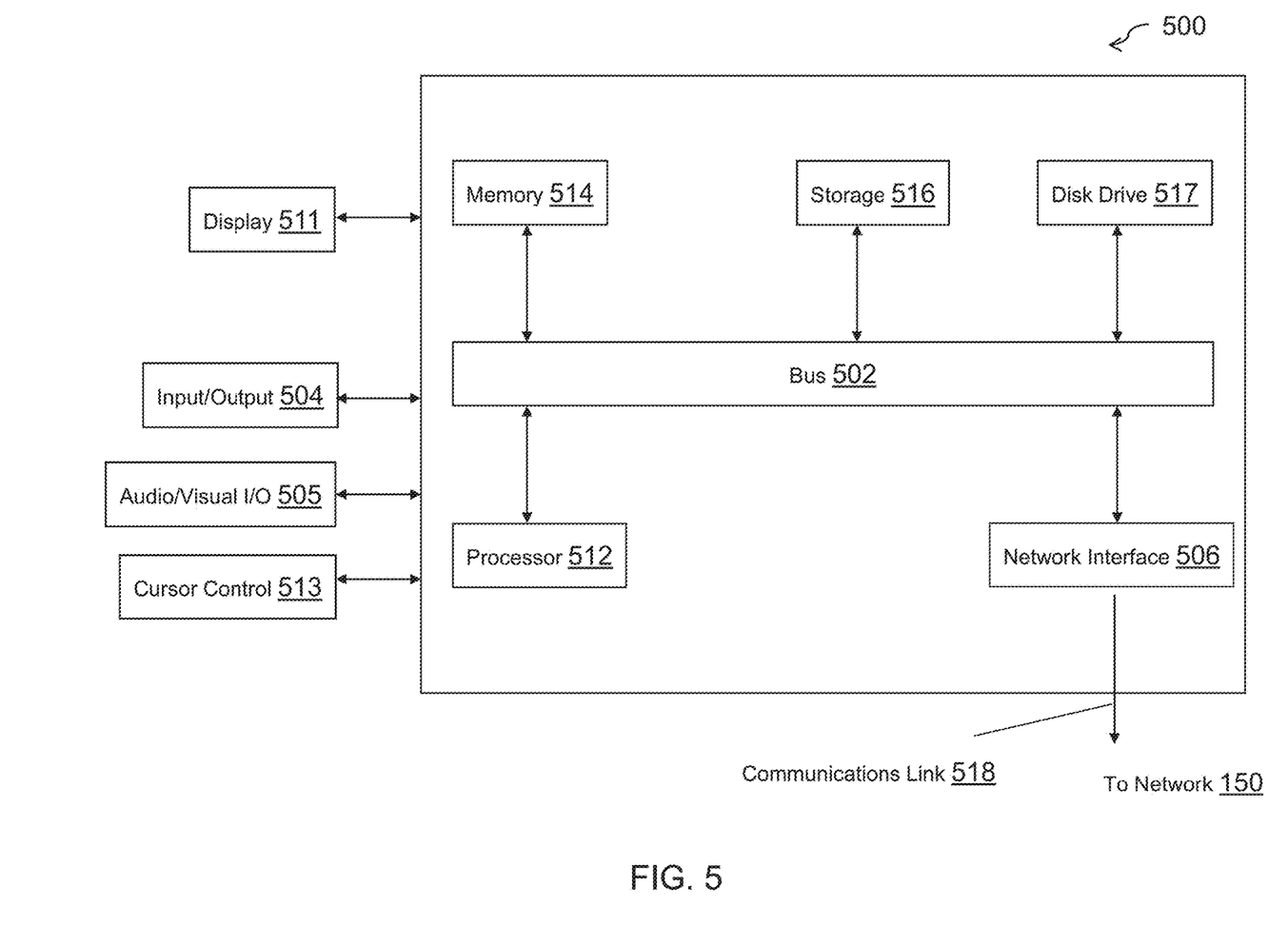
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   receiving, at a first user device system via a wireless communication link with a wireless inter-vehicle communication system of a service provider utilized by a first vehicle, an identity token obtained from the wireless inter-vehicle communications system, wherein the identity token identifies a second vehicle that is distinct from the first vehicle, and wherein the first user device system is distinct from the first vehicle and the service provider;
   determining, by the first user device system, and based on the identity token, a privacy preference for the second vehicle;
   generating, by the first user device system, an inter-vehicle message that is destined for the second vehicle, wherein the inter-vehicle message includes information specified in accordance with the privacy preference for the second vehicle; and
   causing, by the first user device system, the inter-vehicle message to be transmitted to the second vehicle using the wireless communication link, wherein the inter-vehicle message is sent to the second vehicle via the wireless inter-vehicle communications system utilized by the first vehicle.

2. The method of claim 1, wherein content of the inter-vehicle message is based on a current location of the second vehicle.

3. The method of claim 1, wherein content of the inter-vehicle message is based on a current location of the first vehicle.

4. The method of claim 1, wherein the inter-vehicle message comprises an electronic payment request.

5. The method of claim 1, wherein the privacy preference for the second vehicle specifies at least one restriction on identity, time, or reason regarding a user of the second vehicle being contacted regarding the second vehicle.

6. The method of claim 5, wherein the privacy preference specifies that the user of the second vehicle may be contacted regarding an operational issue of the second vehicle.

7. The method of claim 5, wherein the privacy preference specifies that the user of the second vehicle may be contacted regarding a payment required for the second vehicle.

8. The method of claim 7, wherein the payment required is for a parking meter.

9. The method of claim 2, further comprising:
   based on a response to the inter-vehicle message, initiating, the first user device system, a payment on behalf of the second vehicle.

10. The method of claim 9, further comprising:
    receiving, via the first user device system, a reimbursement for the payment on behalf of the second vehicle via a payment service provider.

11. A non-transitory computer-readable medium having stored thereon instructions executable by a user device system to cause the user device system to perform operations comprising:
    receiving, via a wireless communication link with a wireless inter-vehicle communication system of a service provider utilized by a first vehicle, an identity token obtained from the wireless inter-vehicle communications system, wherein the identity token identifies a second vehicle that is distinct from the first vehicle, and wherein the first user device system is distinct from the first vehicle and the service provider;
    determining, based on the identity token, a privacy preference for the second vehicle;
    generating an inter-vehicle message that is destined for the second vehicle, wherein the inter-vehicle message includes information specified in accordance with the privacy preference for the second vehicle; and
    causing the inter-vehicle message to be transmitted to the second vehicle using the wireless communication link, wherein the inter-vehicle message is sent to the second vehicle via the wireless inter-vehicle communications system utilized by the first vehicle.

12. The non-transitory computer-readable medium of claim 11, wherein the operations further comprise:
    performing text analysis on message content of the inter-vehicle message to determine compliance with the privacy preference.

13. The non-transitory computer-readable medium of claim 12, wherein the text analysis includes determining whether the message content comprises an advertisement.

14. The non-transitory computer-readable medium of claim 11, wherein the operations further comprise:
   determining whether to send the inter-vehicle message based on an account status for an account associated with the second vehicle.

15. The non-transitory computer-readable medium of claim 11, wherein the privacy preference for the second vehicle specifies at least one restriction on identity, time, or reason regarding a user of the second vehicle being contacted regarding the second vehicle.

16. A first user device system, comprising:
   a processor;
   a wireless communications unit; and
   a non-transitory computer-readable medium having stored thereon instructions that are executable to cause the first user device system to perform operations comprising:
      receiving, via a wireless communication link with a wireless inter-vehicle communication system of a service provider utilized by a first vehicle, an identity token obtained from the wireless inter-vehicle communications system, wherein the identity token identifies a second vehicle that is distinct from the first vehicle, and wherein the first user device system is distinct from the first vehicle and the service provider;
      determining, based on the identity token, a privacy preference for the second vehicle, wherein the privacy preference includes a restriction on message content that may be transmitted to the second vehicle by the first vehicle;
      generating an inter-vehicle message that is destined for the second vehicle, wherein the inter-vehicle message includes information specified in accordance with the privacy preference for the second vehicle; and
      causing the inter-vehicle message to be transmitted to the second vehicle using the wireless communication link, wherein the inter-vehicle message is sent to the second vehicle via the wireless inter-vehicle communications system utilized by the first vehicle.

17. The first user device system of claim 16, wherein content of the inter-vehicle message is generated automatically by the first vehicle device of the first vehicle.

18. The first user device system of claim 16, wherein the operations further comprise:
   receiving additional data from a third party at the user device system, wherein content of the inter-vehicle message includes the additional data.

19. The first user device system of claim 16, wherein the operations further comprise:
   transmitting an electronic payment request to the second vehicle via the wireless inter-vehicle communications system of the first vehicle.

20. The first user device system of claim 19, wherein the electronic payment request is a request for reimbursement.

* * * * *